(12) United States Patent
Stringer (10) Patent No.: US 11,620,382 B2
(45) Date of Patent: Apr. 4, 2023

(54) TARGETING AND SECURITY AUDIT FOR DIGITAL CONTENT

(71) Applicant: AT&T Technical Services Company, Inc., Vienna, VA (US)

(72) Inventor: Fred Stringer, Freehold, NJ (US)

(73) Assignee: AT&T Technical Services Company, Inc., Vienna, VA (US)

( * ) Notice: Subject to any disclaimer, the term of this patent is extended or adjusted under 35 U.S.C. 154(b) by 74 days.

(21) Appl. No.: 16/793,305

(22) Filed: Feb. 18, 2020

(65) Prior Publication Data

US 2021/0256124 A1    Aug. 19, 2021

(51) Int. Cl.
*G06F 21/56* (2013.01)
*G06F 16/955* (2019.01)
*G06V 30/413* (2022.01)

(52) U.S. Cl.
CPC ........ *G06F 21/565* (2013.01); *G06F 16/9558* (2019.01); *G06F 21/563* (2013.01); *G06V 30/413* (2022.01)

(58) Field of Classification Search
CPC .... G06F 21/565; G06F 21/554; G06F 21/563; G06F 16/9558; G06K 9/00456
See application file for complete search history.

(56) References Cited

U.S. PATENT DOCUMENTS

| 10,909,576 | B1* | 2/2021 | Arivukkarasu | G06Q 30/0269 |
| 2003/0212902 | A1* | 11/2003 | van der Made | G06F 21/563 726/26 |
| 2010/0077483 | A1* | 3/2010 | Stolfo | G06F 21/554 726/23 |
| 2014/0164351 | A1* | 6/2014 | Grant | G06F 16/9558 707/710 |
| 2017/0048280 | A1* | 2/2017 | Logue | H04L 63/0823 |
| 2018/0350144 | A1* | 12/2018 | Rathod | H04W 4/021 |
| 2019/0052651 | A1* | 2/2019 | Cheetancheri | H04L 63/1433 |

* cited by examiner

*Primary Examiner* — Ashokkumar B Patel
*Assistant Examiner* — William B Jones (57) ABSTRACT

Methods, computer-readable media, and devices for auditing digital content to validate that the digital content is authentic, secure, and reaching the intended audience are disclosed. In one example, a method performed by a processing system including at least one processor includes launching a web browser application, wherein the launching includes instantiating a simulated user profile, and wherein the simulated user profile includes a simulated web browsing history, detecting, by the processing system, an item of digital content that is presented to the web browser application in response to the simulated user profile, determining, by the processing system, a relevance of the item of digital content to the simulated user profile, and generating, by the processing system, a report that indicates the relevance of the item of digital content to the user profile.

20 Claims, 4 Drawing Sheets

ADVERTISEMENT A

| DEVICE | IP ADDRESS | CONNECTION TIME | FILE DOWNLOADED | FILE VALID? |
|---|---|---|---|---|
| X | 123.4.567.89 | t | N/A | N/A |
| Y | 234.5.678.91 | t+1 | FILE X | YES |
| Z | 345.6.789.12 | t+2 | FILE Z | YES |
| ... | ... | ... | ... | ... |

TARGETING AND SECURITY AUDIT FOR DIGITAL CONTENT

The present disclosure relates generally to cyber security, and relates more particularly to devices, non-transitory computer-readable media, and methods for auditing digital content to validate that the digital content is authentic, secure, and reaching the intended audience.

BACKGROUND

Digital advertising provides many opportunities to target advertising material to the consumers who are most likely to purchase the advertised goods or services, thereby minimizing wasted advertising. For instance, a consumer's Internet search or browsing history, cookies, social media activity, purchasing history, and/or other data may provide an indication of the consumer's demographic and/or psychographic traits. Providers of goods and services may then pay to have their advertising materials presented to the consumers whose traits and/or purchasing histories are most closely associated with the goods and services.

For instance, if a consumer has performed several Internet searches for information on cars, this may indicate that the consumer is currently considering buying or leasing a car. Consequently, when the consumer uses a Web browser, the advertisements that are displayed to the consumer (e.g., embedded in Web pages) may include advertisements for cars. By contrast, a consumer who has not searched for information on cars (or has not otherwise indicated an interest in cars) may not be presented with the advertisements for cars, but may instead be presented with advertisements for different goods and services related to his or her interests. Similarly, a consumer whose purchasing history indicates multiple previous purchases from a specific retailer may be more likely to be presented with advertisements for that retailer than a consumer who has never purchased from the retailer.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for auditing digital content to validate that the digital content is authentic, secure, and reaching the intended audience. In one example, a method performed by a processing system including at least one processor includes launching a web browser application, wherein the launching includes instantiating a simulated user profile, and wherein the simulated user profile includes a simulated web browsing history, detecting, by the processing system, an item of digital content that is presented to the web browser application in response to the simulated user profile, determining, by the processing system, a relevance of the item of digital content to the simulated user profile, and generating, by the processing system, a report that indicates the relevance of the item of digital content to the user profile.

In another example, a non-transitory computer-readable medium may store instructions which, when executed by a processing system in a communications network, cause the processing system to perform operations. The operations may include launching a web browser application, wherein the launching includes instantiating a simulated user profile, and wherein the simulated user profile includes a simulated web browsing history, detecting, by the processing system, an item of digital content that is presented to the web browser application in response to the simulated user profile, determining, by the processing system, a relevance of the item of digital content to the simulated user profile, and generating, by the processing system, a report that indicates the relevance of the item of digital content to the user profile.

In another example, a device may include a processing system including at least one processor and a non-transitory computer-readable medium storing instructions which, when executed by the processing system when deployed in a communications network, cause the processing system to perform operations. The operations may include launching a web browser application, wherein the launching includes instantiating a simulated user profile, and wherein the simulated user profile includes a simulated web browsing history, detecting, by the processing system, an item of digital content that is presented to the web browser application in response to the simulated user profile, determining, by the processing system, a relevance of the item of digital content to the simulated user profile, and generating, by the processing system, a report that indicates the relevance of the item of digital content to the user profile.

As discussed above, digital advertising provides many opportunities to target advertising material to the consumers who are most likely to purchase the advertised goods or services, thereby minimizing wasted advertising. For instance, a consumer's Internet search or browsing history, cookies, social media activity, and/or other data may provide an indication of the consumer's demographic and/or psychographic traits. Providers of goods and services may then pay to have their advertising materials presented to the consumers whose traits are most closely associated with the goods and services.

However, targeted advertising techniques do not always work perfectly. For instance, some techniques rely on first testing advertising material by showing the advertising material to a small population of consumers (e.g., a sample group of users of a particular social media platform). The consumers who react positively to the advertising material may be identified, and the traits of these consumers may be examined in order to try to detect a correlation between certain traits and the positive reaction. It may be difficult, however, to identify which traits of the consumers contributed to the positive reaction and which traits did not contribute. For instance, just because a large number of the consumers who reacted positively to a dog food advertisement are football fans, this does not necessarily mean that the advertisement should be targeted to football fans. The consumers who reacted positively may simply have enjoyed an image of a cute dog.

Thus, conventional techniques for determining the relevance of advertising materials to different consumers may sometimes result in the advertising materials mistakenly being presented to consumers who do not have any interest in the advertised goods (e.g., an advertisement for dog food being presented to a consumer who does not own a dog). In such a case, an advertiser (i.e., the source of the goods and services being advertised) may spend a great deal of money on targeting advertising material to specific consumers, only to see little return on the expenditure because the advertising material is not reaching the right consumers (i.e., the consumers most likely to be interested in the advertised goods). That is, advertising materials may be presented to consumers who are believed to be interested in the goods and services being advertised. However, if this belief is mistaken, the consumers may not engage with the advertising materials or purchase the goods and services.

In addition to poor targeting, compromise of the advertising materials and/or devices in the supply and distribution chain may also undermine the efficacy of the advertising materials. Digital advertising materials, like many other forms of digital media, may be susceptible to compromise by unauthorized parties. For instance, the domain name server (DNS) settings on a router may be overwritten so that, when a consumer follows (e.g., clicks) a hyperlink that is embedded in a digital advertisement, the consumer is directed to a malicious website instead of to the advertiser's website. The malicious website may even be designed to look like an authentic website for the advertiser, which may fool the consumer into providing personal and/or financial information (e.g., home address, credit card or bank account numbers, authentication information, or the like). This type of manipulation may be referred to as DNS hijacking or DNS redirection.

Other forms of manipulation may cause malicious software ("malware"), adware, spyware, foreign cookies, additional session links, or registry changes of code injection to be downloaded to the consumer's computing device when the hyperlink is followed. In these cases, the advertising materials may "look" safe (e.g., images may appear to be unaltered, hyperlinks may appear to be resolved correctly, etc.). In other words, there may be no obvious outward signs of manipulation. However, malicious software may have been downloaded to the consumer's computing device in the background, unseen by the consumer.

Compromise of digital advertising materials may not only put the security of sensitive consumer data at risk, but may also damage the reputation of the advertiser and/or the advertising agency who may have been hired by the advertiser to generate and distribute the advertising materials. For instance, a consumer who unwittingly downloads malware when clicking on an advertisement for an advertiser's goods may be less likely to trust or purchase from that advertiser, even if the compromise of the advertisement was not the advertiser's fault. This may cause significant damage to the advertiser's brand. For instance, digital security compromises that affect a large number of consumers are often highly publicized, and the effects of the negative publicity may take years to overcome. Similarly, if the advertiser worked with an advertising agency, the advertiser (and other advertisers) may be more reluctant to work with the advertising agency in the future.

Examples of the present disclosure provide a way to audit digital content, such as digital advertising material, in order to validate that the digital content is authentic, secure, and reaching the intended audience. In one example, a plurality of simulated user profiles may be generated. Each simulated user profile may include, for instance, a simulated Internet search history, a simulated cookie history, a simulated Web browser cache, and/or a simulated history of advertisement selections (e.g., click throughs) that collectively are designed to represent a hypothetical user of a Web browser application, where the hypothetical user has a specific set of demographic and/or psychographic traits. Each simulated user profile may be designed to represent a different user (e.g., having a different combination of demographic and/or psychographic traits). The simulated user profiles may be instantiated in a Web browser application and may function as proxies for actual human users. By examining the types of digital content, including advertising material, that is presented by the Web browser application when a particular simulated user profile is instantiated, it may be possible to verify that the digital content is being presented to the intended audience for the digital content (e.g., advertisements for dog products are being presented to dog owners).

Within the context of the present disclosure, the term "simulated" is understood to mean artificial or contrived. For instance, a "simulated" user profile does not represent a real user of a Web browser application (e.g., is not constructed from the activities, interests, or data of an actual person), but rather is constructed artificially in order to present the appearance of a specific, desired set of user traits. Similarly, a "simulated" Internet search history, cookie history, Web browser cache, or history of advertisement selections is constructed artificially to present the Internet search history, cookie history, Web browser cache, or history of advertisement click selections that a hypothetical user having specific traits might build, but does not represent the actual activities of any one real user.

Further examples of the present disclosure may also provide a way to audit the authenticity and security of the digital content, e.g., to ensure that the digital content has not been tampered with in a manner that may put sensitive consumer information or resources at risk. For instance, in some examples, an image associated with a digital advertisement may be compared to a stored (e.g., trusted) image in order to verify that the image being displayed to consumers is the image intended by the advertiser. In further examples, a communication session (e.g., a transmission control protocol/Internet protocol (TCP/IP) session or a user datagram protocol (UDP) session) may be tracked, e.g., to determine the ports and/or devices (DNS servers, Web servers, routers, and/or other network devices) traversed and to further determine whether a connection to any of these devices resulted in the download of unintended or unauthorized content (e.g., malware, adware, spyware, foreign cookies, additional session links, code injection, etc.) that may put sensitive consumer data or resources at risk. For instance, each time a proxy device following a hyperlink connects to a new network device, the proxy device may be scanned for newly downloaded files. Any newly downloaded file that is detected may be evaluated in order to verify whether the newly downloaded file should have been (e.g., was expected to be) downloaded by the proxy device. This may allow an advertiser to detect when a hyperlink embedded in digital advertising materials, or a device in the supply and distribution chain of the digital advertising materials, has been compromised (e.g., hijacked).

Although examples of the present disclosure are described within the context of advertising, it will be appreciated that the methods, computer-readable media, and devices described herein could be applied to any type of digital media, including other types of digital media that may be targeted to users displaying specific demographic and/or psychographic traits. These and other aspects of the present disclosure are discussed in greater detail below in connection with the examples of FIGS. 1-4.

Figure 1:
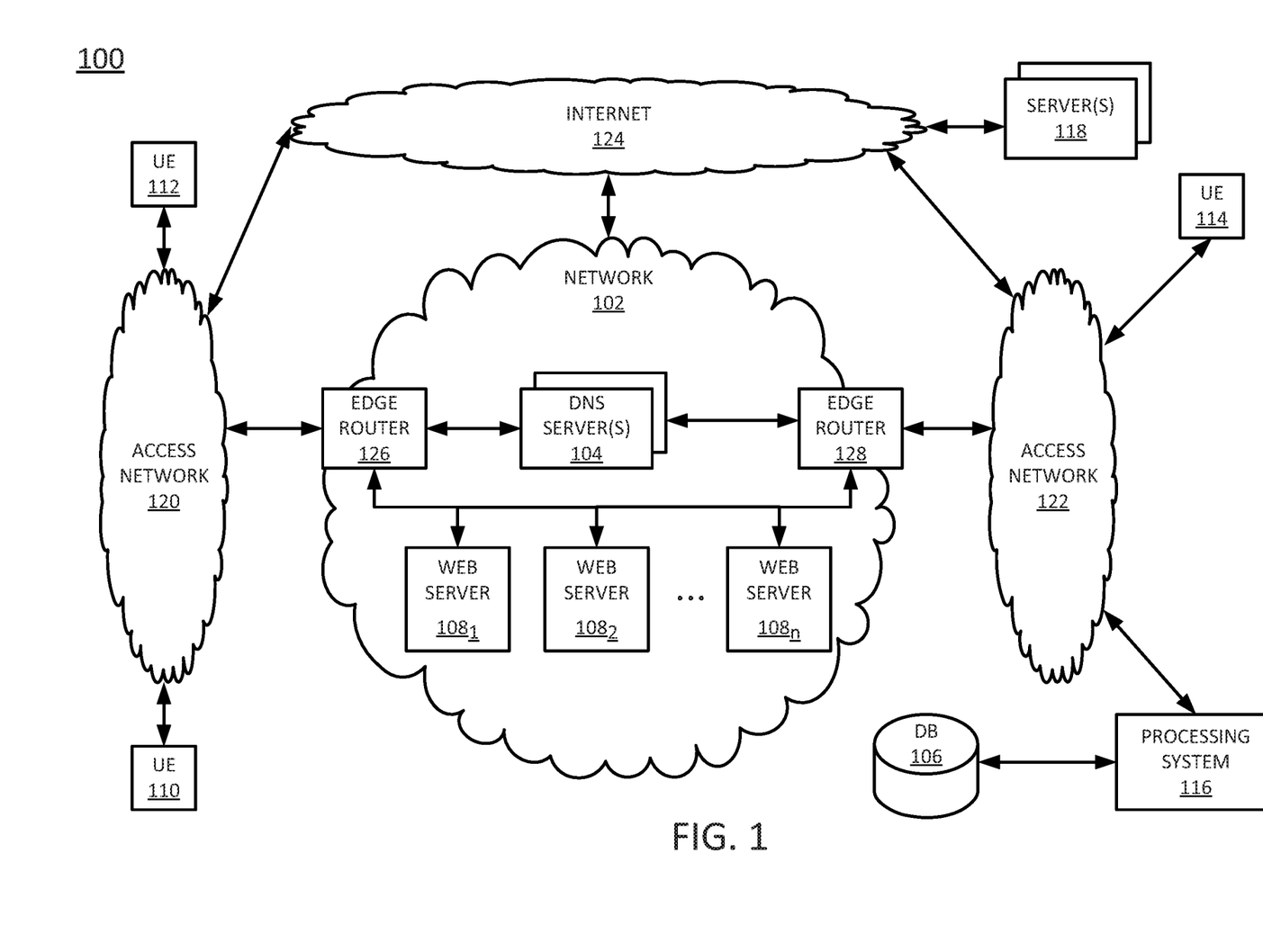
FIG. 1 illustrates an example network related to the present disclosure.

To further aid in understanding the present disclosure, FIG. 1 illustrates an example system 100 in which examples of the present disclosure for auditing digital content to validate that the digital content is authentic, secure, and reaching the intended audience may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a network 102. The network 102 may be in communication with one or more access networks 120 and 122, and with the Internet 124. In one example, network 102 may combine core network components of a wired or cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth (not shown). As further illustrated in FIG. 1, network 102 may include at least one domain name (DNS) server 104, a plurality of Web servers 1081-108n (hereinafter individually referred to as a "Web server 108" or collectively referred to as "Web servers 108"), and a plurality of edge routers 126-128. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 110 and 112. Similarly, access network 122 may be in communication with one or more user endpoint devices, e.g., user endpoint device 114. Access networks 120 and 122 may transmit and receive communications between user endpoint devices 110, 112, and 114, between user endpoint devices 110, 112, and 114, server(s) 118, DNS server(s) 104, web servers 108, other components of network 102, devices reachable via the Internet in general, and so forth. In one example, each of user endpoint devices 110, 112, and 114 may comprise any single device or combination of devices that may comprise a user endpoint device. For example, the user endpoint devices 110, 112, and 114 may each comprise a mobile device, a cellular smart phone, a gaming console, a set top box, a laptop computer, a tablet computer, a desktop computer, an application server, a bank or cluster of such devices, and the like. In one example, any of the user endpoint devices 110, 112, and 114 may comprise sensor devices with wireless networking hardware, e.g., Internet of Things (IoT) devices, for gathering measurements of an environment, uploading the measurements to one or more servers or other devices, and so forth.

In one example, one or more servers 118 may be accessible to user endpoint devices 110, 112, and 114, to processing system 116, and so forth via Internet 124 in general. Each of the one or more servers 118 may be associated with one or more IP addresses to enable communications with other devices via one or more networks. Each of the server(s) 118 may be associated with, for example, a merchant, a service business, a news source, a weather source, a school, a college or university, or other educational content providers, a social media site, a content distribution network, a cloud storage provider, a cloud computing application host, and so forth.

In operation, a DNS system (which may include the DNS servers 104 as well as a client that may be built into the Web browser application of a user endpoint device 110, 112, 114, a server 118, or the processing system 116) may receive queries from the user endpoint devices 110, 112, 114, servers 118, and/or processing system 116. The queries may comprise uniform resource locators (URLs) for websites. An example URL may comprise, for instance, a word or a string of words that is easy for a human to remember, such as examplebank.com. The URLs may be typed by a user into a search bar of a search engine. Alternatively, the URLs may be associated with hyperlinks that are followed using the user endpoint devices 110, 112, 114, servers 118, and/or processing system 116 (e.g., hyperlinks that are presented by Web browser applications running on the user endpoint devices 110, 112, 114, servers 118, and/or processing system 116).

The DNS system may resolve the URLs into corresponding IP addresses (e.g., strings of numbers that are less easy for humans to remember, such as 151.101.129.121). Each IP address may be associated with a different one of the Web servers 108, and each Web server 108 may store component files (e.g., hypertext markup language (HTML) documents, images, JavaScript files, and the like) for one or more websites. Some of the one or more websites may be commercial in nature, such that an advertiser may advertise and/or sell goods and services via the websites.

Once the DNS system has resolved a URL into the corresponding IP address, the corresponding IP address may be provided to the client (which may reside on the user endpoint device 110, 112, 114, server 118, and/or processing system 116, as discussed above). The client may then connect directly to an associated Web server 108 to access a website, using the corresponding IP address. In other examples, the corresponding IP address may direct the client to multiple Web servers or to a load balancer. Thus the DNS system may be used to resolve an IP address to connect a consumer to a website that the consumer wishes to visit (e.g., a website for which the consumer has entered a URL or clicked on an embedded hyperlink).

Figure 4:
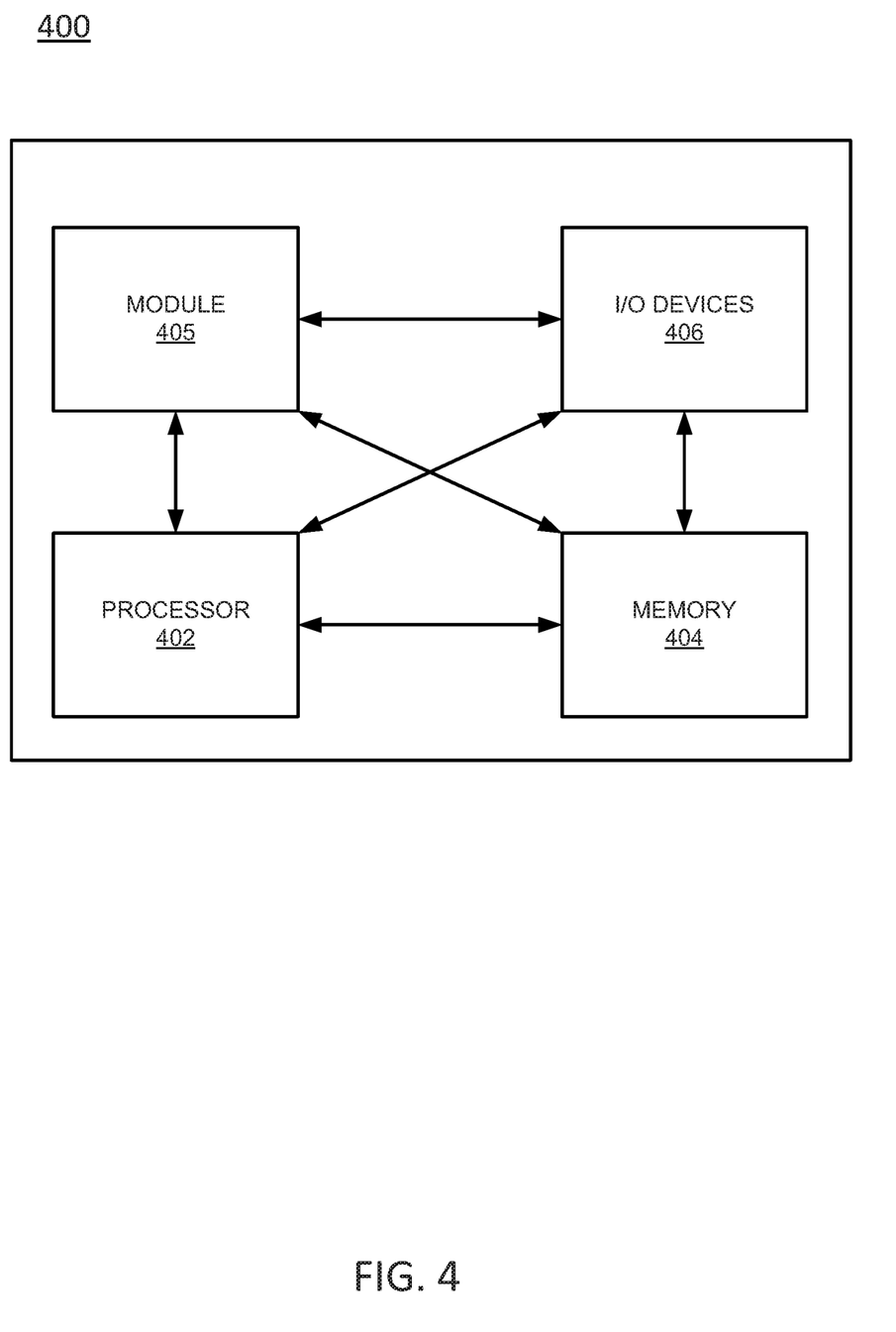
FIG. 4 illustrates an example of a computing device, or computing system, specifically programmed to perform the steps, functions, blocks, and/or operations described herein.

In accordance with the present disclosure, the processing system 116 may comprise a computing system or server, such as computing system 400 depicted in FIG. 4, and may be configured to provide one or more operations or functions in connection with examples of the present disclosure for auditing digital content to validate that the digital content is authentic, secure, and reaching the intended audience, as described herein. For instance, the processing system 116 may act as a proxy for a user endpoint device. To this end, the processing system 116 may comprise any hardware platform and operating system that has Internet connectivity and is capable of running a software application for auditing digital content to validate that the digital content is authentic, secure, and reaching the intended audience. The processing system 116 may include one or more commercial components (e.g., a Web browser application, an antivirus scanner, a registry change detector, a file storage system, a database). For instance, the processing system 116 may operate a Web browser application that is instantiated with a simulated user profile, described in further detail below. The processing system 116 may track the targeted content that is presented within the Web browser application in response to the simulated user profile.

In further examples, the processing system 116 may track connections made to other devices in the network (e.g., DNS servers 104, Web servers 108, other servers 118, edge routers 126 and/or 128, and/or other devices) as a result of following or selecting (e.g., clicking) a hyperlink that is embedded in the targeted content. For instance, the processing system 116 may track the communication session that results from following the hyperlink, where the communication session may traverse a plurality of network devices. Tracking of the communication session may, in one example, also involve tracking the origin of any file that is downloaded during the communication session. For instance, each time the processing system 116 connects to a network device during the communication session, the processing system may record information about the network device (e.g., uniform resource locator (URL), IP address, and/or other identifying information). The processing system 116 may also determine whether the connection to the network device resulted in any files (e.g., cookies, malware, injected code, etc.) being downloaded by the processing system 116. When the processing system 116 downloads a file that is not expected to be downloaded, this may indicate that the targeted content has been compromised.

The processing system may additionally or alternatively track the ports involved in the communications with the other devices. For instance, a single session between a pair of IP addresses could be conducted using TCP or UDP, and within the TCP or UDP protocols, specific ports may be utilized. For instance, port 80 is typically associated with hypertext transfer protocol (HTTP), port 443 is typically associated with secure HTTP (HTTPS), port 21 is typically associated with file transfer protocol (FTP), and so on. Ports may also be referred to as applications. Logging and analyzing the ports may help the processing system to detect when multiple sessions (some perhaps not intended by the consumer) exist between the same source and destination IP addresses, or when a port that is not expected to be active is accessed. For instance, a malicious website may try to log into a consumer's computing device in order to steal files from the computing device. The malicious website may try to log into the computing device via a port not typically used for TCP or UDP. Although a firewall or proper system configuration could prevent access by deactivating unused ports, the average consumer may not be utilize such precautions.

The processing system 116 may have access to at least one database (DB) 106, where the DB 106 may store simulated user profiles that allow the processing system 116 to function as a proxy for a user endpoint device of a user with particular demographic and/or psychographic traits. In this context, "demographic" traits may refer, for example, to age, gender, economic status, nationality, level of education, type of employment, area of residence, or the like. "Psychographic" traits may refer, for example, to values, personality, attitudes, opinions, interests, purchasing history, brand loyalty, and the like.

For instance, a simulated user profile may comprise a simulated Internet search or browsing history (e.g., a history of websites visited, search terms entered in a search engine, etc.). The simulated user profile may additionally or alternatively comprise simulated cookies (i.e., data sent by websites and stored on user endpoint devices, such as tracking cookies used to tracking browsing history), a simulated browser cache for the Web browser application (e.g., images, text, and/or the like from previously visited websites), a simulated purchasing history, and/or a simulated history of advertisement selections (e.g., followed hyperlinks associated with advertising materials).

The DB 106 may store a plurality of different simulated user profiles, where each simulated user profile may comprise a different combination of simulated Internet search history, simulated browsing history, simulated cookies, simulated browser cache, and/or simulated history of advertisement selections. Thus, each simulated user profile may be tailored to function as a proxy for a different set of demographic and/or psychographic traits (e.g., to represent a different "user"). For instance, one simulated user profile may be tailored to represent a female user, over the age of thirty, with an income above $80,000, and a search history relating to new cars. Another simulated user profile may be tailored to represent a male user, over the age of twenty, with a search history relating to organic dog food products.

In addition to simulated user profiles, the DB 106 may store other information to assist in auditing the security and authenticity of digital content. For instance, the DB 106 may store trusted images of the digital content, which may be compared to images that are presented to consumers in order to validate the images that are presented to the consumers (e.g., to verify that the images have not been tampered with). The trusted images may include metadata, watermarks, and/or hashes to assist in validation.

In another example, the DB 106 may store a list of websites to be validated, where the websites are websites on which the digital content is expected to be presented. For instance, a website may include designated areas where brokered digital content (e.g., digital content for which the website collects a fee to display) may be displayed. Examples of the present disclosure may examine each such website to validate that the website is displaying the appropriate digital content. In this case, the list of websites may change dynamically and frequently, e.g., as real-time data updates are received from brokers.

In another example, the DB 106 may store results of audits that are performed on digital content. For instance, the DB 106 may store audits whose results were "good" (e.g., validated to be secure, authentic, and presented to the intended audience), for the purposes of reporting. As an example, an advertising agency may provide a portion of the "good" results to partners or prospective partners in order to demonstrate the security and/or efficacy of their services. The DB 106 may also store audits whose results were "bad" (e.g., possible compromises were detected), for the purposes of alarming and reporting. As an example, the "bad" results may be provided to sources of the digital content associated with the "bad" results, in order to notify the sources of possible compromises in the digital content.

In another example, the DB 106 may store one or more transaction templates, which may define URLs, network devices, software, images, and the like which are expected to be encountered when following a hyperlink embedded in an item of digital content. For instance, an image may include an embedded hyperlink such that, when a consumer clicks on the image, the Web browser application of the consumer's computing device is directed to a specific website. A transaction template may define the expected series of connections and events (e.g., file downloads) for a specific item of digital content or a specific type of transaction, and the transaction template may be relied on to determine when a connection or event resulting from following a hyperlink is unexpected. In one example, a transaction template may store both expected session data (e.g., expected IP addresses, ports, byte counts, and/or the like) and expected results (e.g., expected new cookies, new malware, new trackers, new registry configurations, new system configurations (closed ports are opened for later exploitation), and/or the like) for each item of digital content or transaction type.

In another example, the DB 106 may comprise multiple databases, where each database of the multiple databases stores different data. For instance, a first database may store the simulated user profiles, a second database may store trusted images, a third database may store a list of websites to be validated, a fourth database may store "good" validation results, a fifth database may store "bad" validation results, a sixth database may store transaction templates, and a seventh database may store other audit-related data. In some examples, any two or more of these multiple databases may be combined into a single database. For instance, all validation results, "good" or "bad," may be stored in a single database. The databases may store data locally (e.g., on local disks), or the databases may be distributed across a plurality of hosts (as long as network connectivity allows). In a further example, the network 102 may not include a database at all; for instance, the stored data may be stored locally by the processing system 116.

In an illustrative example, the processing system 116 and/or DB 106 may be operated by an advertising agency seeking to ensure that advertising materials the agency is responsible for creating and/or distributing remain secure, authentic, and are targeted to the intended consumers. For instance, the processing system 116 may instantiate a simulated user profile from the DB 106 and may observe the advertisements that are presented in a Web browser application in response to the simulated user profile. The processing system 116 may verify that the advertisements are of an expected nature, based on the simulated user profile that was instantiated.

The processing system 116 may follow (e.g., click) one of the advertisements, with an expectation that the selection of the advertisement will have some specific result (e.g., a connection to a specific URL, a traversal of a specific series of network devices, a download of a specific cookie). The processing system 116 may further detect when the actual result deviates from the expected result. For instance, the processing system 116 may detect when the URL returned by the DNS servers 104 does not match an expected URL for a selected hyperlink (which may indicate an instance of DNS hijacking). The processing system 116 may also detect when one or more unexpected network devices (e.g., Web servers 108) are traversed in the process of connecting to an expected URL (which may indicate a "man in the middle" attack). The processing system 116 may also detect when an unexpected file is downloaded in the process of connecting to an expected URL (which may indicate "drive by" malware). The processing system may also detect when an image (e.g., of advertising material) that is presented does not match a stored or trusted image that is expected to be presented.

In accordance with the present disclosure, the processing system 116 may comprise one or more physical devices, e.g., one or more computing systems or servers, such as computing system 400 depicted in FIG. 4, and may be configured to provide one or more operations for auditing digital content to validate that the digital content is authentic, secure, and reaching the intended audience, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Moreover, the processing system 116 may be implemented as a standalone system, in an enterprise data center, in a public or private data center, in a public or private hosting center, and/or in any one or more other systems for running applications in the cloud.

In one example, DB 106 may comprise a physical storage device integrated with the processing system 116 (e.g., a database server or a file server), or attached or coupled to the processing system 116, to store simulated user profiles, in accordance with the present disclosure. In one example, the processing system 116 may load instructions into a memory, or one or more distributed memory units, and execute the instructions for auditing digital content to validate that the digital content is authentic, secure, and reaching the intended audience, as described herein. An example method for auditing digital content to validate that the digital content is authentic, secure, and reaching the intended audience is described in greater detail below in connection with FIG. 2.

It should be noted that examples of the present disclosure may operate from almost any location in a network. For example, the system embodied in the processing system 116 may operate from a source premises (e.g., a source of advertising materials, such as an advertising agency), an advertiser's premises, or a third party premises (where the third party may offer support services for auditing digital content). Access to the World Wide Web may have little effect except for instances in which good bandwidth connectivity is desired. Examples of the present disclosure may also be implemented in a hosting center or in cloud services in a variety of mechanisms (e.g., virtual machines, containers, virtual private servers, and/or the like).

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet 124 may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. For example, user endpoint devices 110, 112, and 114 and processing system 116 may communicate with network 102 via different access networks, user endpoint devices 110 and 112 may communicate with network 102 via different access networks, and so forth. In still another example, one or more of DNS servers 104 and/or Web servers 108 may be deployed external to network 102 (e.g., a public DNS server), or the system 100 may include one or more additional DNS servers or Web servers external to network 102. Thus, these and other modifications are all contemplated within the scope of the present disclosure.

Figure 2:
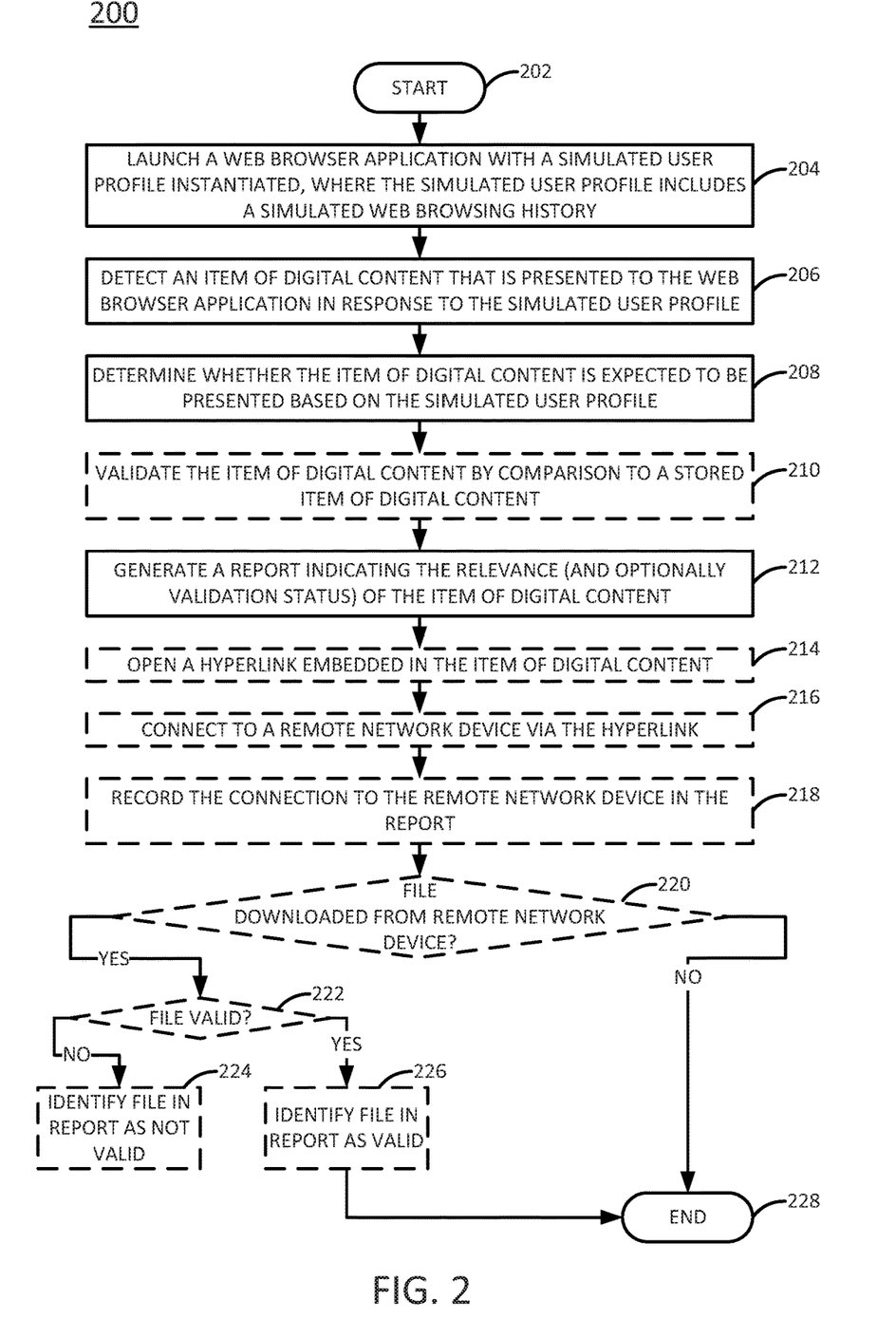
FIG. 2 illustrates a flowchart of an example method for auditing digital content to validate that the digital content is authentic, secure, and reaching the intended audience, in accordance with the present disclosure.

FIG. 2 illustrates a flowchart of an example method 200 for auditing digital content to validate that the digital content is authentic, secure, and reaching the intended audience, in accordance with the present disclosure. In one example, steps, functions and/or operations of the method 200 may be performed by a device as illustrated in FIG. 1, e.g., processing system 116 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the processing system 116 in accordance with the present disclosure. For illustrative purposes, the method 200 is described in greater detail below in connection with an example performed by a processing system, such as processing system 402.

In some examples, the processing system may run through a system preparation process prior to start of the method 200. The system preparation process assumes that the processing system is running application software for auditing digital content, as disclosed herein, and that the processing system has Internet connectivity.

In one example, the system preparation process may begin by loading the digital content to be audited. As discussed above, the digital content to be audited may include digital advertisements to be displayed on websites. The digital content to be audited may be loaded to the processing system from a media or file transfer. In addition, the processing system may load a list that indicates, for each item of digital content that is to be audited, the correct destination (e.g., URL) associated with the item of digital content. For instance, if an item of digital content comprises an advertisement for Brand X dog food, then the correct destination associated with the item of digital content may be the website for Brand X. Upon loading the digital content, the processing system may create a separate repository for each item of digital content, where the repository for a given item of digital content stores the audit results for the given item of digital content.

In a further example, the system preparation process may also load at least one simulated user profile for each item of digital content that is to be audited. Like the digital content, the simulated user profiles may be loaded to the processing system from a media or file transfer. A simulated user profile for an item of digital content may comprise a simulated user profile that is designed to emulate certain traits associated with the item of digital content. For instance, continuing the example in which the item of digital content is an advertisement for Brand X dog food, the simulated user profile for the item of digital content may be designed to emulate traits of a dog owner. If a simulated user profile that is loaded includes a simulated Internet search history, then the processing system may connect a local Web browser application to the Internet, and may perform the searches in the simulated Internet search history in order to build the Internet search history in the local system and on the Internet.

In a further example, the system preparation process may also load at least one website on which at least one of item of the digital content is to be displayed. Like the digital content and the simulated user profile(s), the website(s) may be loaded to the processing system from a media or file transfer. The website on which an item of digital content is to be displayed may be a website that displays sponsored content. For instance, continuing the example in which the item of digital content is an advertisement for Brand X dog food, the website on which the advertisement is displayed may be a blog or online publication for dog owners, where the blog or online publication may include areas in which advertisements can be displayed (e.g., along the side of the page, at the bottom of the page, etc.). In one example, where a broker may auction digital content for display on a real time basis, the processing system may include an application programming interface (API) to the broker. The list of websites that display the digital content may change dynamically and frequently (e.g., updated every x seconds) in this case.

Once the processing system has been properly prepared to perform the audit, the method 200 may begin. The method 200 begins in step 202 and proceeds to step 204. At step 204, the processing system may launch a Web browser application (i.e., an application designed to allow users to retrieve information from the World Wide Web). In one example, the processing system may include an executive routine which calls the Web browser application and any other commercial tools (e.g., antivirus scanners, registry change detectors, file storage systems, databases, etc.) that may be utilized in performance of the method 200.

Launch of the Web browser application in step 204 may include instantiating a simulated user profile. As discussed above, the simulated user profile may be one of a plurality of simulated user profiles that is accessible to the processing system. Each simulated user profile, including the simulated user profile that is instantiated, may be designed to function as a proxy for a user having predefined demographic and/or psychographic traits. In one example, the predefined demographic and/or psychographic traits may be emulated through a simulated Web browsing history. For instance, if a simulated user profile is designed to function as a proxy for a user who owns a dog, then a simulated Web browsing history associated with the simulated user profile may include a plurality of websites relating to dog care (e.g., places to buy dog products, dog-friendly travel destinations, dog walking services, etc.).

In further examples, the predefined demographic and/or psychographic traits may be emulated through a simulated Internet search history, a simulated cookie history, a simulated browser cache, a simulated purchase history, and/or a simulated history of advertisement selections (clicks). For instance, continuing the above example of the profile designed to function as a proxy for a dog owner, a simulated Internet search history may include a plurality of simulated keyword searches for entry in a Web search engine (e.g., "best organic dog foods," "dog-friendly hotels in New York City," "how to house train a puppy," etc.). A simulated cookie history may include cookies storing user names (e.g., a user name for logging into a veterinarian's patient portal or an account with a pet store website) and/or tracking cookies storing information about visited websites, products viewed, and the like (e.g., dog toys viewed on a pet store website). A simulated purchase history may include a plurality of simulated purchases from ecommerce websites (e.g., a pet store website, the website for a specific brand of dog care products, etc.). A simulated history of advertisement selections may include products associated with hypothetical advertisements presented to a user (e.g., dog toys, dog food, dog training services, etc.).

In one example, the simulated user profile may be called by the same executive routine that calls the Web browser application.

At step 206, the processing system may detect an item of digital content that is presented to the Web browser application in response to the simulated user profile. That is, the item of digital content may be targeted to the simulated user profile. For instance, as discussed above, some websites may display advertising material or other types of targeted digital content in certain regions of a webpage (e.g., along the side, at the bottom, etc.). The item of digital content that is detected in step 206 may comprise an image, a video, text, and/or other types of media displayed on a website that is presented to the Web browser application. The website may be selected from a list of websites loaded by the processing system prior to performance of the method 200. For instance, continuing the example above in which the simulated user profile is designed to function as a proxy for a dog owner, the item of digital content may comprise an advertisement for a particular brand of dog food, where the advertisement comprises an image with some text superimposed over the image (e.g., "Buy Brand X dog food!"). The advertisement may be presented in a sidebar of a news website.

In step 208, the processing system may whether the item of digital content is an item of digital content that is expected to be presented based on the simulated user profile (e.g., whether the "right" digital content is presented). In one example, one or more of the items of digital content that are loaded to the processing system may be expected to be presented when a specific simulated user profile is instantiated in step 204. Expected items of digital content may be items of digital content that are considered to be relevant to the traits emulated in the simulated user profile. Thus, step 208 may serve to validate that the item of digital content reaches users who exhibit appropriate traits (e.g., a dog food advertisement is reaching dog owners). In one example, the items of digital content that are expected to be presented based on a specific simulated user profile are predefined (e.g., for simulated user profile A, items B and C are expected).

In optional step 210 (illustrated in phantom), the processing system may validate the item of digital content by comparing the item of digital content to a stored (e.g., trusted) item of digital content. In one example, the item of digital content may be determined to be valid (e.g., authentic) if the item of digital content matches the stored item of digital content. For instance, if the item of digital content comprises an advertising image, and the advertising image matches an image provided by the advertiser or advertising agency (e.g., an image of the "correct" or authentic advertisement), then the advertising image may be more likely to be valid (conversely, if the advertising image does not match the image provided, then the advertising image may be less likely to be valid, or more likely to have been tampered with). In one example, a likelihood of the item of digital content being valid may be expressed as a function of any differences between the item of digital content and the stored item of digital content. For instance, for each detected difference between the item of digital content and the stored item of digital content, a counter may be incremented. The higher the value of the counter in this instance, the less likely the item of digital content is to be valid. As an example, the counter value would be zero for an item of digital content that is identical to the item of stored digital content. In one example, if the counter value exceeds a predefined threshold, then the item of digital content may be considered to be likely not valid. Conversely, if the counter value is equal to or falls below the predefined threshold, then the item of digital content may be considered to be likely valid.

In step 212, the processing system may generate a report indicating the whether the item of digital content was expected to be presented based on the simulated user profile, and optionally additionally indicating the validation status of the item of digital content (if the validation step 210 was performed). The indication as to whether the item of digital content was expected to be presented may help an advertiser whose goods or services are advertised in the item of digital content to determine whether the item of digital content is reaching the target audience (e.g., is an advertisement for dog food reaching consumers who are likely to purchase dog food, such as dog owners?). The validation status of the item of digital content may help the advertiser to determine whether the specific instance of the item of digital content that is presented to potential consumers has been compromised (e.g., altered by unauthorized parties).

In optional step 214 (illustrated in phantom), the processing system may follow a hyperlink that is embedded in the item of digital content. As discussed above, the item of digital content may comprise an image, video, text, and/or other media. A hyperlink may be embedded in the item of digital content, such that when a user clicks on the image, video, text, and/or other media, the embedded hyperlink is followed. In one example, the hyperlink that is embedded in the item of digital content may comprise a hyperlink associated with a website that sells goods or services that relate to the traits emulated in the simulated user profile. For instance, continuing the example above in which the simulated user profile is designed to function as a proxy for a dog owner, the hyperlink embedded in the item of digital content may be associated with a website that sells dog food, dog toys, kennel services, training services, and the like.

In optional step 216 (illustrated in phantom), the processing system may connect to a remote network device via the hyperlink that was followed in step 214. For instance, in one example, followed of the hyperlink may cause a request to be sent to a DNS server, where the request comprises a request to translate a URL associated with the hyperlink into an IP address. The IP address may then be returned to the processing system, which may use the IP address to connect to the remote network device. Thus, in one example, the remote network device may be a Web server. The Web server in this case may present a website to the processing system via the Web browser application, where the website may advertise or provide an opportunity for a user to purchase goods and services from the advertiser.

In some examples, the following of a hyperlink may initiate a communication session between the processing system and one or more network devices including the remote network device. The communication session may traverse a plurality of network devices (e.g., routers, servers, and the like) in order to connect the processing system to the remote network device. For instance, a connection to a first network device may cause the processing system to be redirected to a second, different network device in some cases.

In optional step 218 (illustrated in phantom), the processing system may record the connection to the remote network device. For instance, in one example, each time the processing system connects to a network device as a result of following the hyperlink, the network device may be recorded in an audit log.

Figure 3:
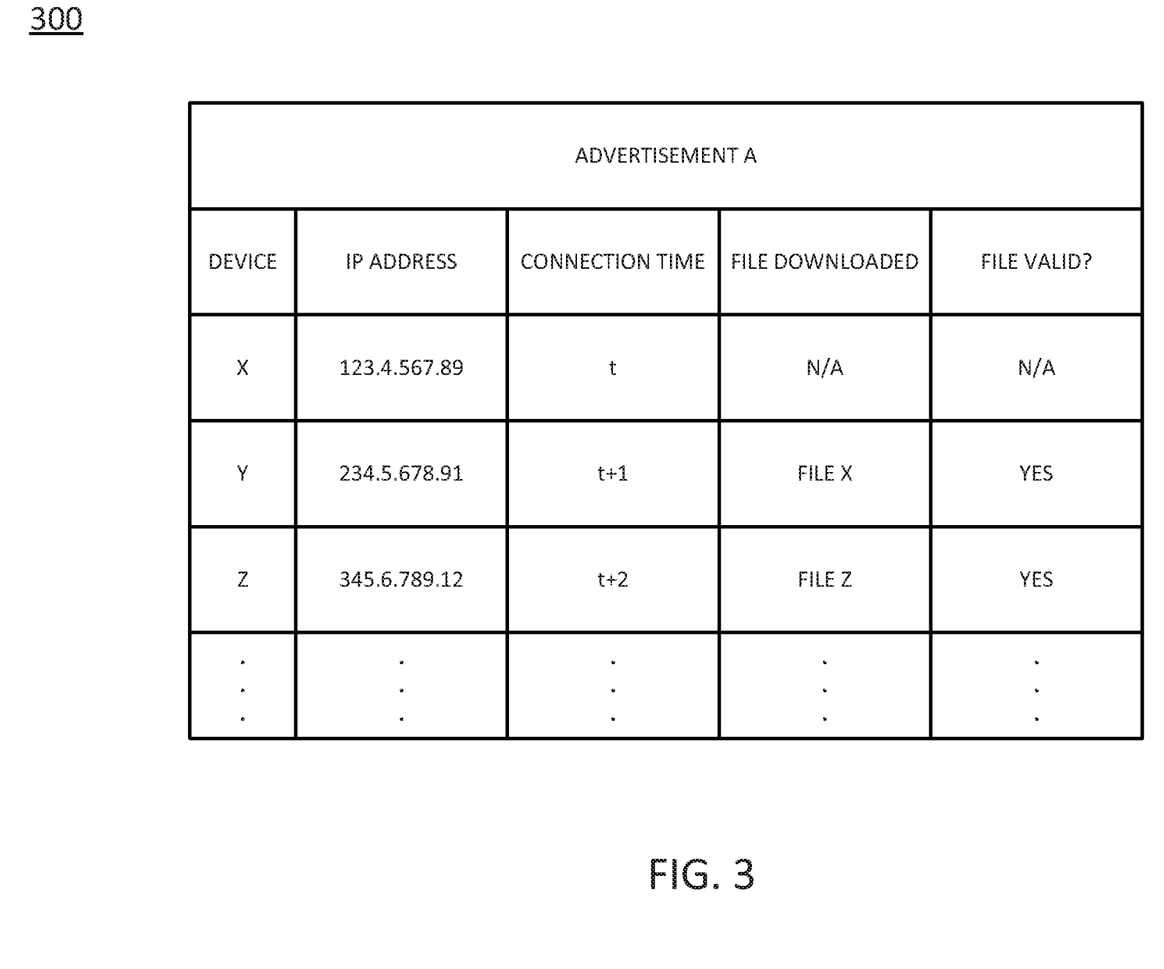
FIG. 3 illustrates one example of an audit log that may be generated in accordance with the method of FIG. 2.

FIG. 3, for instance, illustrates one example of an audit log 300 that may be generated in accordance with the method 200. As illustrated, the audit log may specify, for each network device (e.g., X, Y, Z, etc.) to which the processing system connects after following the hyperlink (for example Advertisement A), an IP address e.g., 123.4.567.89, 234.5.678.91, 345.6.789.12, etc.), a URL, or another identifier, as well as a time (e.g., t, t+1, t+2, etc.) of the connection. As discussed in further detail below, the audit log may also identify any files (e.g., file x, file z, etc.) downloaded to the processing system as a result of the connection, and whether the files are believed to be secure (e.g., able to be opened or executed without jeopardizing sensitive consumer data or resources). This may allow the processing system to detect when any unexpected background processes are occurring (e.g., malware or spyware that was automatically downloaded upon connecting to a network device).

The audit log may also allow the processing system to detect when a URL of the remote network device does not match an expected URL of the remote network device. For instance, if the audit log records a URL that is known to be compromised, or a URL that is different from an expected URL based on the item of digital content (e.g., the item of digital content is an image of Brand X dog food, but the URL that to which the processing system connects when the item of digital content is clicked is a URL for Brand Y dog food), then the processing system may determine that the hyperlink may have been compromised.

In optional step 220 (illustrated in phantom), the processing system may determine whether any file was downloaded by the processing system from the remote network device, e.g., as a result of the connection. For instance, in one example, each time the processing system connects to a new network device after following the hyperlink, the processing system may perform a self-check. The self-check may involve, for example, scanning a session file for the connection, which may include scanning a downloads folder in a memory of the processing system for any files downloaded since a last scan, detecting any new processes or threads that have begun to execute since a last scan, or other techniques. Potentially downloaded files may include, for example, images, cookies, executable files (e.g., malware, adware, spyware, viruses, etc.), code injection, and other types of files.

If the processing system determines in step 220 that a file was downloaded to the processing system from the remote network device, then the method may proceed to optional step 222. In step 222 (illustrated in phantom), the processing system may determine whether the downloaded file is likely to be valid (e.g., whether the presence of the downloaded file on a user endpoint device would be likely to put sensitive data or resources at risk). In one example, the downloaded file may be determined to be not likely to be valid if the downloaded file matches or is similar to a file that is known to be malicious or dangerous. For instance, if the downloaded file is an executable file with a filename or extension that matches the filename or extension of a known computer virus, then the downloaded file may be determined to be not likely to be valid. Similarly, if the downloaded file is a text file whose wording is similar to the wording of a known phishing communication, then the downloaded file may be determined to be not likely to be valid. In another example, if content of the downloaded file is similar to content that is known to be valid (or at least, not malicious or dangerous), then the downloaded file may be determined to be likely valid. For instance, if the downloaded file appears to be a conventional cookie, the downloaded file may be likely to be valid (or at least not malicious or dangerous).

If the processing system determines in step 222 that the downloaded file is likely not valid, then the method 200 may proceed to optional step 224. In step 224 (illustrated in phantom), the processing system may identify the downloaded file as likely not valid. For instance, the processing system may record, in the audit log described above, that the downloaded file is likely not valid. The likely validity of the downloaded file may be recorded, for example, as a binary yes or no indicator (as illustrated in FIG. 3), as a likelihood (e.g., percentage) of security, or in another manner. A downloaded file that is not likely to be valid may indicate that the hyperlink (or one of the network devices to which the hyperlink connects) may have been compromised. Thus, the report may further indicate that the communication session or path (e.g., network devices traversed) may have been compromised. Moreover, because the audit log indicates from which network device a file was downloaded, it may be easier to identify the specific portion of the session or path that was compromised (e.g., which network device was hijacked).

In one example, identifying the downloaded file as likely not valid may include generating an alarm or alert. For instance, an audible or visible alarm may be triggered by the processing system (e.g., a dialog may appear on a display connected to the processing system).

Alternatively, if the processing system determines in step 222 that the downloaded file is likely valid, then the method 200 may proceed to optional step 226. In step 226 (illustrated in phantom), the processing system may identify the downloaded file as likely valid. For instance, as discussed above, the processing system may record, in the audit log described above, that the downloaded file is likely valid. The likely validity of the downloaded file may be recorded, for example, as a binary yes or no indicator (as illustrated in FIG. 3), as a likelihood (e.g., percentage) of validity, or in another manner. A downloaded file that is likely to be valid may indicate that the hyperlink (and the network devices to which the hyperlink connects) are functioning properly and have not been compromised.

Thus a goal of steps 214-116 is to verify several things, namely: (1) that following the hyperlink led to the expected "destination" (e.g., website); and (2) that the connection to the destination is not suspicious. If the hyperlink does not lead to the expected destination, this may indicate that the hyperlink has been hijacked (e.g., manipulated to misdirect users who follow the hyperlink, possibly to a malicious website).

One factor that may be cause for suspicion with respect to the connection may include whether the connection was direct (e.g., the hyperlink was followed, the processing system was connected to a website, and now a new communication session with a new website has been established). In some cases, two or more communication sessions may be open at the same time. For instance, a consumer may be browsing a website for a car dealership during a first communication session, and an advertisement for dog food may be displayed. If the consumer clicks on the dog food advertisement, the click may result in a second, concurrent communication session being established with the website to which the dog food advertisement directs (e.g., in a separate window or tab from the first communication session).

In other examples, a second communication session may be established within a first communication session, rather than independently from the first communication session. This scenario may be less likely, since many modern Web browsing applications allow for multiple concurrent communication sessions and will simply create a new window or tab for each communication session to be displayed. However, for any pair of communication sessions between which there should be no processing occurring in the background of the processing system, this processing in the background may be identified as suspicious. For instance, the processing may indicate that a man in the middle attack is occurring (e.g., an unseen third party is recording or otherwise observing the communication session).

Once the downloaded has been recorded as likely valid (in step 226) or likely not valid (in step 224), the method 200 may end in step 228. Additionally, if the processing system determines in step 220 that no files were downloaded by the processing system from the remote network device, then the method 200 may bypass steps 224-226 and proceed directly to step 228.

In one example, the report may be sent to a human operator for review and action. For instance, the report may be sent to an email address or a user endpoint device associated with the human operator. The human operator may use the report to identify possible points of compromise in the supply and distribution chain for the item of digital content. The human operator may also use the report to guide modifications to an algorithm that is used to target the item of digital content.

It should be noted that the method 200 represents a process of auditing one item of digital content for one simulated user profile. In practice, the method 200 may be repeated any number of times for any number of items of digital content and/or simulated user profiles. For instance, the method 200 may be repeated, using the same simulated user profile, for a plurality of items of digital content. Then, a new simulated user profile may be instantiated, and the method 200 may be repeated for the plurality of items of digital content using the new simulated user profile. In one example, this process may repeat for any number of simulated user profiles. Moreover, the method 200 may be repeated for the same item of digital content, using multiple simulated user profiles. For instance, an item of digital content may be targeted to multiple different types of consumers (and, consequently, may be displayed on multiple different websites)

In one example, the method 200 may be performed simultaneously for multiple different combinations of simulated user profiles, websites, and items of digital content. That is, each combination of item of digital content and simulated user profile to be audited need not necessarily be performed in series, or one at a time. An executive routine that is part of the processing system may control the simultaneous audit for the multiple different combinations. The executive routine in this case may also monitor the progress of the audit and may fetch the next website to be audited when appropriate. The executive routine may push the URL of the next website to the Web browser application.

Thus, the method 200 may validate that an item of digital content, such as an online advertisement, is shown to consumers who are likely to engage with the item of digital content (e.g., consumers who exhibit traits associated with the advertised goods or services). The method 200 may further validate that the item of digital content has not been compromised at any point in the supply and distribution chains, and that, if a hyperlink is embedded in the item of digital content, the hyperlink directs a consumer to the proper website.

In further examples, the report, including the audit log information, may be used to determine when a transaction or session initiated by clicking the item of digital content matches a template of an expected transaction or session. For instance, if the transaction or session initiated by the clicking of the item of digital content deviates from the template (e.g., traverses an unexpected network device, downloads an unexpected file, etc.), this may indicate a possible compromise somewhere in the supply and distribution chain.

Examples of the present disclosure may operate independently of all other systems in the content supply and distribution chain. For instance, assuming that the digital content comprising advertising material, examples of the present disclosure may be implemented by an advertiser (e.g., a provider of goods or services) to ensure that the advertising material does not put the information or resources of the advertiser's targeted consumers at risk. Alternatively, examples of the present disclosure may be implemented by an advertising agency (e.g., an agency which creates and/or distributes advertising material on behalf of an advertiser) to ensure that the advertising agency's work product does not put the information or resources of their client's potential customers at risk. In another example, examples of the present disclosure may be implemented by a repository of digital advertising material or a website that displays advertising material, in order to ensure that the information or resources of users who interact with the advertising material or the website are not put at risk. In another example, examples of the present disclosure may be implemented by a third party advertising server, where the third party makes decisions regarding the targeting of advertising materials. In this case, examples of the present disclosure may validate the efficacy of any targeting algorithms used by the third party. In another example still, examples of the present disclosure may be implemented as a service by a party who is not a part of the supply and distribution chain at all.

Examples of the present disclosure may operate in any Internet connected platform (e.g., a private server, a private cloud, a public cloud, a hybrid cloud, etc.) and may be capable of auditing digital content in any Internet connected websites (e.g., private cloud, public cloud, enterprise, or hybrid, etc.).

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for auditing digital content to validate that the digital content is authentic, secure, and reaching the intended audience, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner fora particular illustrative example, i.e., the steps of the above method 200, or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 405 for auditing digital content to validate that the digital content is authentic, secure, and reaching the intended audience (e.g., a software program comprising computer-executable instructions) can be loaded into memory 404 and executed by hardware processor element 402 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for auditing digital content to validate that the digital content is authentic, secure, and reaching the intended audience (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
launching, by a processing system including at least one processor, a web browser application, wherein the launching includes instantiating a simulated user profile, and wherein the simulated user profile functions as a proxy for a user having at least one of: a predefined demographic trait or a predefined psychographic trait;
detecting, by the processing system, an advertisement that is displayed on a website visited by the web browser application in response to the simulated user profile that is instantiated, wherein the advertisement is targeted to the at least one of: the predefined demographic trait or the predefined psychographic trait;
determining, by the processing system, whether the advertisement belongs to a predefined set of advertisements that is expected to be displayed in response to the simulated user profile; and
generating, by the processing system, a report that indicates whether the advertisement was expected to be displayed in response to the simulated user profile, based on the determining.

2. The method of claim 1, wherein the simulated user profile further comprises a simulated internet search history.

3. The method of claim 1, wherein the simulated user profile further comprises a simulated cookie history.

4. The method of claim 1, wherein the simulated user profile further comprises a simulated cache for the web browser application.

5. The method of claim 1, wherein the simulated user profile further comprises a simulated history of advertisement selections.

6. The method of claim 1, further comprising:
comparing, by the processing system, an image of the advertisement to a stored image, wherein the stored image comprises a trusted image of advertisement;
detecting, by the processing system, a mismatch in a form of a difference between the image of the advertisement and the stored image; and
indicating, by the processing system in the report, that the image of advertisement may have been compromised.

7. The method of claim 1, further comprising:
following, by the processing system, a hyperlink that is embedded in the advertisement, via the web browser application; and
connecting, by the processing system, to a remote network device via the hyperlink.

8. The method of claim 7, further comprising:
tracking, by the processing system, a communication session and a port number via which the processing system connects to the remote network device, wherein the communication session traverses a plurality of network devices between the processing system and the remote network device; and
recording, by the processing system, a path of the communication session and the port number in the report.

9. The method of claim 8, further comprising:
detecting, by the processing system, that a file has been downloaded by the processing system as a result of connecting to one network device of the plurality of network devices;
determining, by the processing system, that the file is not valid; and
indicating, by the processing system in the report, that the path of the communication session may be compromised.

10. The method of claim 8, further comprising:
detecting, by the processing system, a uniform resource locator of the remote network device;
determining, by the processing system, that the uniform resource locator of the remote network device does not match an expected uniform resource locator associated with the hyperlink; and
indicating, by the processing system in the report, that the hyperlink may have been compromised.

11. The method of claim 8, further comprising:
detecting, by the processing system, an unexpected network device in the plurality of network devices, wherein the unexpected network device is a network device that does not appear in a template of the communication session.

12. The method of claim 9, wherein the file comprises a cookie.

13. The method of claim 9, wherein the file comprises malicious software.

14. The method of claim 9, wherein the file comprises at least one of: a registry change to an operating system of the processing system or a configuration change to the operating system.

15. The method of claim 1, wherein the simulated user profile includes a simulated web browsing history.

16. The method of claim 1, wherein the advertisement is obtained by the web browser application separately from the simulated user profile.

17. The method of claim 1, wherein the simulated user profile is one of a plurality of simulated user profiles stored in a database, and each simulated user profile of the plurality of simulated user profiles functions as a proxy for a different user having a different combination of predefined demographic traits and predefined psychographic traits, and wherein each simulated user profile of the plurality of simulated user profiles is associated with a different predefined set of advertisements that is expected to be displayed in response to the each simulated user profile.

18. The method of claim 1, wherein each advertisement in the predefined set of advertisements is relevant to the at least one of: the predefined demographic trait or the predefined psychographic trait.

19. A non-transitory computer-readable medium storing instructions which, when executed by a processing system in a communications network, cause the processing system to perform operations, the operations comprising:
launching a web browser application, wherein the launching includes instantiating a simulated user profile, and wherein the simulated user profile functions as a proxy for a user having at least one of: a predefined demographic trait or a predefined psychographic trait;
detecting an advertisement that is displayed on a website visited by the web browser application in response to the simulated user profile that is instantiated, wherein the advertisement is targeted to the at least one of: the predefined demographic trait or the predefined psychographic trait;
determining whether the advertisement belongs to a predefined set of advertisements that is expected to be displayed in response to the simulated user profile; and
generating a report that indicates whether the advertisement was expected to be displayed in response to the simulated user profile, based on the determining.

20. A device comprising:
a processing system including at least one processor; and
a non-transitory computer-readable medium storing instructions which, when executed by the processing system while connected to the internet, cause the processing system to perform operations, the operations comprising:

launching a web browser application, wherein the launching includes instantiating a simulated user profile, and wherein the simulated user profile functions as a proxy for a user having at least one of: a predefined demographic trait or a predefined psychographic trait;

detecting an advertisement that is displayed on a website visited by the web browser application in response to the simulated user profile that is instantiated, wherein the advertisement is targeted to the at least one of: the predefined demographic trait or the predefined psychographic trait;

determining whether the advertisement belongs to a predefined set of advertisements that is expected to be displayed in response to the simulated user profile; and generating a report that indicates whether the advertisement was expected to be displayed in response to the simulated user profile, based on the determining.

\* \* \* \* \*